United States Patent [19]

Nozawa et al.

[11] 4,334,746
[45] Jun. 15, 1982

[54] PHOTOGRAPHIC LENS BARREL

[75] Inventors: Hideyo Nozawa, Ohmiya; Hideshi Naito, Tokyo, both of Japan

[73] Assignee: Nippon Kogaku K.K., Tokyo, Japan

[21] Appl. No.: 160,535

[22] Filed: Jun. 18, 1980

[30] Foreign Application Priority Data

Jul. 13, 1979 [JP] Japan .................................. 54/88196

[51] Int. Cl.³ .......................... G03B 15/02; G03B 3/00
[52] U.S. Cl. .................................... 354/126; 354/196; 354/198
[58] Field of Search ................... 354/62, 79, 105, 109, 354/159, 196, 198, 126

[56] References Cited

U.S. PATENT DOCUMENTS 2,529,894 11/1950 Altman et al. ...................... 354/198
3,995,289 11/1976 Shono ................................ 354/109

Primary Examiner—Russell E. Adams
Attorney, Agent, or Firm—Shapiro and Shapiro

[57] ABSTRACT

A photographic lens barrel includes display means capable of displaying photographing magnifications, an optical system for imaging the display effected by the display means, and drive means for driving the display means so as to cause the magnification displayed to correspond to the position of a movable focusing lens and for driving a diaphragm blade so as to cause the amount of aperture of the diaphragm blade to correspond to the position of the movable focusing lens.

8 Claims, 4 Drawing Figures

PHOTOGRAPHIC LENS BARREL

BACKGROUND OF THE INVENTION

1. Field of the Invention

This invention relates to a photographic lens barrel suitable for close-up photography using a flash unit and for photography in which the magnification during the close-up photography is photographed on a film.

2. Description of the Prior Art

Having the magnification of a lens photographed on a film along with an object is useful particularly during close-up photography from the viewpoints of analysis, arrangement and the like of photographs. For example, when surgical operations are photographed, photographing of magnification is necessary to judge the size or the like of the affected parts.

Also, when surgical operations are photographed, it is often the case that flash photography is effected in view of the environmental conditions. Therefore, an operation peculiar to the flash unit, for example, the operation of setting an object distance and aperture value corresponding to the guide number, is required.

To meet such a requirement, there have heretofore been separately provided (1) a medical lens of the type in which a plurality of types of close-up lenses are prepared for a fixed focus lens so that a close-up lens corresponding to a desired photographing magnification is selected from among them and is mounted to the fixed focus lens and in which the magnification of the selected close-up lens is manually set and photographed on a film and (2) a lens in which when the guide number of the flash unit is set, the aperture value is varied in accordance with the object distance so as to satisfy the calculation equation of the guide member.

Lenses used exclusively for taking medical photographs are required to have the functions of the both lenses mentioned under items (1) and (2) above, but there have heretofore been no such lenses.

SUMMARY OF THE INVENTION

It is an object of the present invention to provide a lens barrel which has the aforementioned two functions and yet contributes to compactness of the lens.

The lens barrel of the present invention achieves such object by including display means capable of displaying magnifications, an optical system for imaging the display effected by the display means, and drive means for driving the display means so as to cause the magnification displayed to correspond to the position of a movable focusing lens and for driving a diaphragm blade so as to cause the aperture of the diaphragm blade to correspond to the position of the movable focusing lens. Further, by contructing the drive means as a relay gear rotatable in response to the focusing operation and having at least two output gears, a first connecting member disposed at one side of the direction of the optical axis of the lens with respect to the relay gear and meshing with one of the output gears to drive the diaphragm blade, and a second connecting member disposed at the other side of the direction of the optical axis of the lens with respect to the relay lens and meshing with the other of the output gears to change over the display for photographing the magnification, the space occupied by the first and second connecting members radially of the inner periphery of a fixed ring is reduced and as a result, the rate at which the first and second connecting members come into the space within the fixed ring necessary to support or move the lens can be reduced, thereby preventing bulkiness of the lens barrel.

The invention will become more fully apparent from the following detailed description of embodiments thereof taken in conjunction with the accompanying drawings.

DESCRIPTION OF THE PREFERRED EMBODIMENTS

Figure 1:
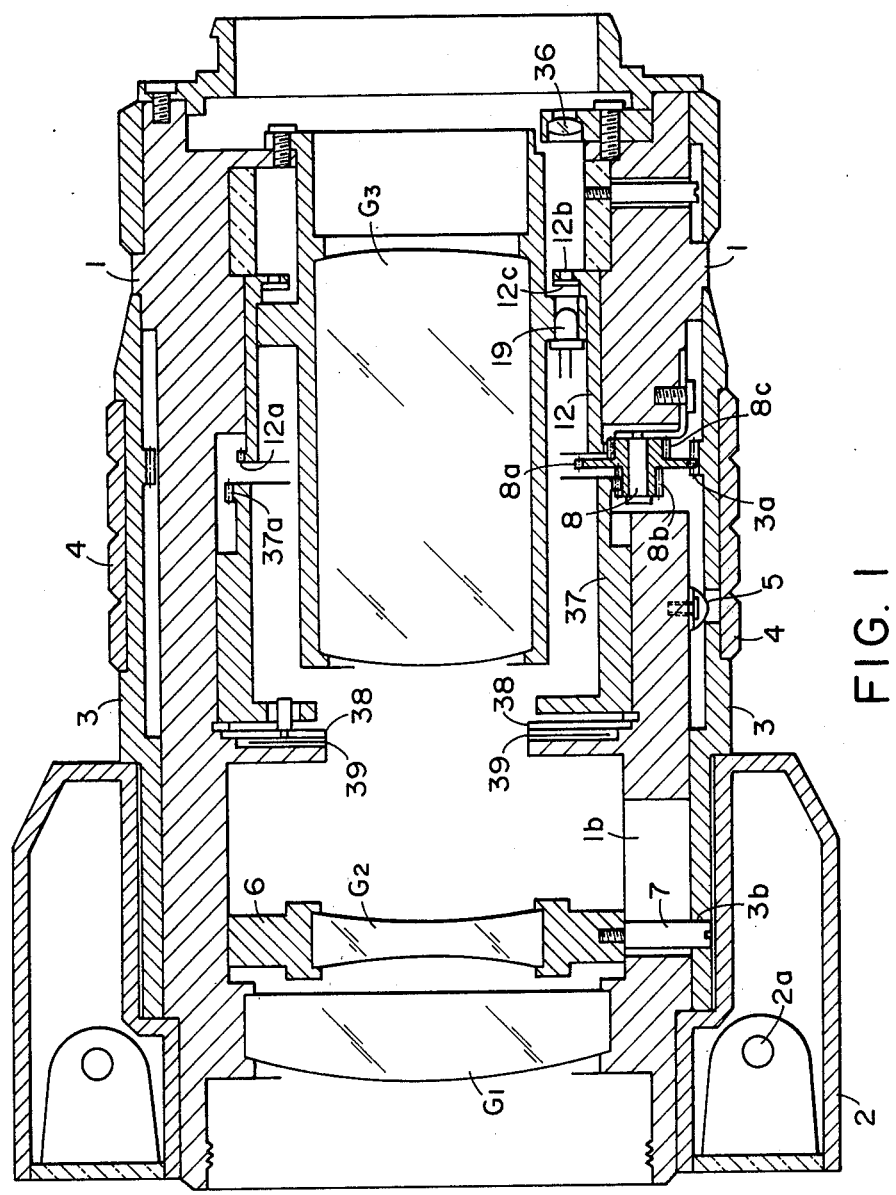
FIG. 1 is a longitudinal cross-sectional view of an embodiment of the present invention.

Referring to FIG. 1, a focusing ring 3 is rotatably fitted on the outer periphery of a fixed ring 1. A flash unit 2 having a ring-like light-emitting portion 2a may be mounted on the fixed ring 1 and may be used for flash photography. A rubber ring 4 is a finger operating portion for operating the focusing ring 3.

Lenses $G_1$–$G_3$ together constitute an image forming optical system of the internal focusing type. That is, for example, photography from infinity to the proximity range, i.e., close-up is made possible by movement of the movable lens $G_2$. A pin 7 fixed to a lens support 6 of this movable lens $G_2$ extends through a groove 1b of the fixed ring 1 and is fitted in a cam groove 3b of the focusing ring 3. Thus, when the focusing ring 3 is rotated, the lens $G_2$ is moved axially to effect focusing and, thereby, the magnification is also varied.

Figure 2:
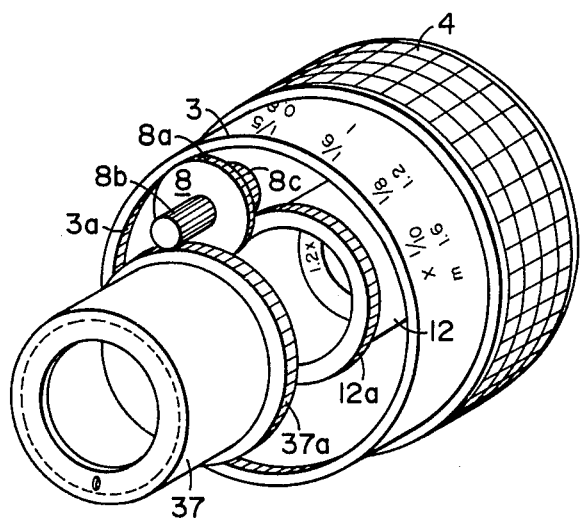
FIG. 2 is a perspective view of essential portions of the embodiment of FIG. 1.

A large-diameter gear (input gear) 8a of a relay gear 8 extends through the fixed ring 1 and is in mesh engagement with an inner gear 3a of the focusing ring 3. A small-diameter gear (first output gear) 8b of the relay gear 8 is located on one side of the large-diameter gear 8a and is in mesh engagement with a gear 37a of an intermediate rotatable member (first connecting member) 37. A medium-diameter gear (second output gear) 8c of the relay gear 8 is located on the other side of the large-diameter gear 8a and is in mesh engagement with a gear 12a of a display ring (second connecting member) 12. Rotation of the focusing ring 3 is transmitted, on the one hand, to a diaphragm blade 39 through the small-diameter gear 8b, the intermediate rotatable member 37 and a diaphragm blade driving ring 38, and transmitted, on the other hand, to the display ring 12 through the medium-diameter gear 8c. The first connecting member 37 and the display ring (second connecting member) 12 coaxial with the optical axis of the lens and disposed on opposite sides of the large-diameter gear 8a of the relay gear 8, as shown in FIGS. 1 and 2. The transmission of the rotation of the focusing ring 3 to the diaphragm blade 39 varies the aperture value F in accordance with the object distance D so as to satisfy the guide number GN equation of the flash unit, namely, the relation that GN=D·F, where D is the irradiation distance, i.e., object distance, and F is the effective F-number.

Figure 3:
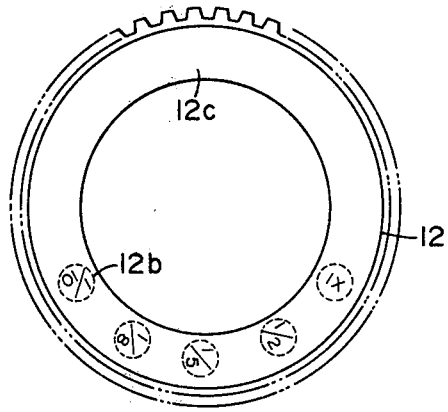
FIG. 3 is a front view of a display ring portion of the embodiment of FIG. 1.

A light-transmitting film 12c having a magnification scale thereon and a light-intercepting plate provided with a plurality of lighting apertures 12b are secured to the display ring 12. This magnification scale need not cover all the range of magnification values from infinity to the proximity range. For example, magnification values of 1/10×, ⅛×, 1/5×, ½× and 1× are indicated at predetermined points on the scale. The apertures 12b of the light-intercepting plate are provided in opposed relationship with the plurality of scale graduations, as shown in FIG. 3. When the lens $G_2$ is moved to the proximity range by rotation of the focusing ring 3, one of the apertures 12b of the display ring 12 becomes opposed to a light-emitting diode 19. To inform the operator of the fact that the focusing ring 3 has been rotated to the position in which such opposed relationship has been established, a click 5 is provided. That is, each time the magnification in the proximity range has become a predetermined value, the click is exerted. If desired, a magnification scale may also be provided on the outer periphery of the focusing ring 3 and an index mark may be provided on the fixed ring 1 to given an external display which will be convenient for operation.

By turning on the light-emitting diode 19 at the position in which the click is exerted, one of the graduations of the magnification display scale, corresponding to the set magnification, will be imaged on the surface of a film (not shown) by the action of a lens 36, thereby permitting the magnification in the proximity range to be photographed along with the object.

In the above-described embodiment, the relay gear 8 is provided through the fixed ring 1 and the first and second output gears 8b and 8c are provided on the opposite sides of the input gear 8a, and the gears 12a and 37a are in mesh engagement with the output gears 8b and 8c with the input gear 8a interposed therebetween. Therefore, the relay gear 8 can be accommodated within the fixed ring 1, thus contributing to compactness of the lens barrel. Also, by suitably setting the gear ratio of the gears 8a, 8b, 8c and the gear 3a, the reduction gear ratio for the rotation of the display ring 12 and intermediate rotatable member 37 with respect to the rotation of the focusing ring 3 can be set freely.

Figure 4:
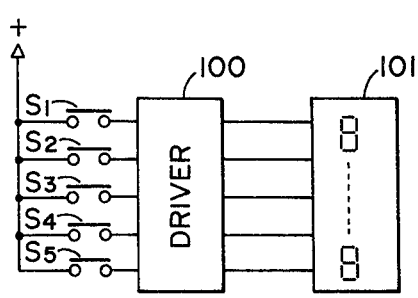
FIG. 4 shows a modification of the display portion.

FIG. 4 shows another embodiment of the present invention.

As is apparent from what has hitherto been described, the magnification display is automatically changed by rotation of the display ring 12. Therefore, in this embodiment, instead of illuminating the display scale by a light-emitting diode, the position of the display ring 12 may be electrically detected to drive, for example, a segment display 101 in accordance with the photographing magnification. In FIG. 4, switches $S_1$-$S_5$ detect the position of the display ring 12. As the ring is rotated, these switches successively close to display the magnification corresponding to each position of the ring. A driver 100 causes the display 101 to display the magnification as determined by the closing of the switches. The display may be activated and photographed in response to the closing of a synchro-contact of the camera, for example.

We claim:

1. A photographic lens comprising:
   (a) a first image forming optical system for imaging an object to be photographed, said first image forming optical system including focusing lens means movable along the optical axis of said first image forming optical system for focusing on the object;
   (b) operating means for driving said focusing lens means;
   (c) display means capable of displaying the magnification of the object by said first image forming optical system;
   (d) a second image forming optical system for imaging the magnification display effected by said display means;
   (e) a diaphragm device for controlling the quantity of light passed through said first image forming optical system; and
   (f) drive means operatively associated with said operating means for causing said display means to vary said magnification display in accordance with the position of said focusing lens means and for driving said diaphragm device so as to vary the aperture of said diaphragm device in a predetermined manner in accordance with the position of said focusing lens means.

2. A photographic lens according to claim 1, further comprising a flash unit for illuminating the object, and wherein said drive means drives said diaphragm device so as to vary the aperture in accordance with the equation $GN = D \cdot F$, wherein GN is the guide number of said flash unit, D is the irradiation distance to said object and F is the effective F-number of the aperture.

3. A photographic lens according to claim 1, wherein said drive means comprises a relay gear rotatable in response to said operating means about an axis parallel to and radially displaced from the optical axis of said first image forming optical system, the relay gear having first and second output gears, a first member having a gear engaged with the first output gear for rotation therewith, the first member being coupled to the diaphragm device for varying said aperture in accordance with the rotation of the first output gear, and a second member having a gear engaged with the second output gear for rotation therewith, the second member being associated with the display means for varying the magnification display in accordance with the rotation of the second output gear.

4. A photographic lens according to claim 3, wherein the first and second members are coaxial with and rotatable about said optical axis and are axially spaced from one another, and wherein said relay gear is positioned between said first and second members and said first and second output gears are located on opposite sides of said relay gear to engage the respective gears of the first and second members.

5. A photographic lens according to claim 3, wherein said operating means comprises a focusing ring having an inner gear in mesh engagement with an input gear of said relay gear, and wherein the sizes of said first and second output gears are selected with respect to the size of said input gear to impart preselected amounts of rotation to said first and second members when the focusing ring is rotated.

6. A photographic lens according to claim 3, wherein the display means comprises a light-transmitting ring connected to the second member, the ring having a plurality of magnification indications thereon which are successively positionable with respect to the second image forming optical system for display in accordance with the rotation of the second member, and a light-emitting element for illuminating the magnification indications to enable their display.

7. A photographic lens comprising:
   a first image forming optical system for imaging an object to be photographed, said first image forming optical system including focusing lens means movable along the optical axis of said first image forming optical system for focusing on the object;

operating means for driving said focusing lens means;

display means capable of displaying the magnification of the object by the said first image forming optical system;

a second image forming optical system for imaging the magnification display effected by said display means;

a diaphragm device for controlling the quantity of light passing through the first image forming optical system; and drive means comprising a first member for driving said diaphragm device so as to vary the aperture of said diaphragm device in a predetermined manner in accordance with the position of said focusing lens means, a second member for causing said display means to vary said magnification display in accordance with the position of said focusing lens means, said first and second members being coaxial with and rotatable about said optical axis and axially displaced from one another, and a relay member disposed between said first and second members and movable in response to said operating means for causing rotation of the first and second members.

8. A photographic lens according to claim 7, wherein said relay member comprises a relay gear rotatable about an axis parallel to and radially displaced from said optical axis, the relay gear having an input gear coupled to said operating means and having first and second output gears located on opposite sides of said input gear and engaged with the first and second members.

* * * * *